(12) United States Patent
Nicolas

(10) Patent No.: US 11,656,760 B2
(45) Date of Patent: May 23, 2023

(54) VEHICLE TOUCH CONTROL SYSTEM AND METHOD

(71) Applicant: Continental Automotive GmbH, Hannover (DE)

(72) Inventor: Michel Nicolas, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/625,199

(22) PCT Filed: Aug. 17, 2020

(86) PCT No.: PCT/EP2020/073004
§ 371 (c)(1),
(2) Date: Jan. 6, 2022

(87) PCT Pub. No.: WO2021/037599
PCT Pub. Date: Mar. 4, 2021

(65) Prior Publication Data
US 2022/0261145 A1   Aug. 18, 2022

(30) Foreign Application Priority Data

Aug. 28, 2019 (FR) ...................................... 1909458

(51) Int. Cl.
*G06F 3/04883* (2022.01)
*B60K 37/06* (2006.01)
(Continued)

(52) U.S. Cl.
CPC .......... *G06F 3/04883* (2013.01); *B60K 37/06* (2013.01); *G06F 3/0418* (2013.01);
(Continued)

(58) Field of Classification Search
CPC ............... G06F 3/04883; G06F 3/0418; G06F 3/04817; G06F 3/1423; B60K 37/06;
(Continued)

(56) References Cited

U.S. PATENT DOCUMENTS

2015/0029111 A1   1/2015 Trachte
2017/0349099 A1*  12/2017 Kunze ................ G02B 27/0101

FOREIGN PATENT DOCUMENTS

| EP | 3508370 A1 | 7/2019 |
| FR | 2969782 A1 | 6/2012 |
| WO | 2013091119 A1 | 6/2013 |

OTHER PUBLICATIONS

International Search Report and Written Opinion for International Application No. PCT/EP2020/073004, dated Oct. 27, 2020, with partial English translation, 8 pages.
(Continued)

*Primary Examiner* — Yaron Cohen
(74) *Attorney, Agent, or Firm* — RatnerPrestia

(57) ABSTRACT

A control system installed aboard a vehicle and configured to allow the user to control, by performing a touch gesture on a control touch screen, a function of the equipment of the vehicle. The control system includes a computation module, the control touch screen and a remote screen that is configured to display display data corresponding to said function in the user's field of vision. The control touch screen is configured to generate instruction data associated with a control area on which the user performs the touch gesture on the basis of the display data displayed by the remote screen. The computation module is configured to generate the display data; to determine, on the basis of the instruction data, the function controlled by the user; and to communicate with the equipment of the vehicle so that the equipment activates the function controlled by the user.

9 Claims, 3 Drawing Sheets

(51) Int. Cl.
  *G06F 3/041* (2006.01)
  *G06F 3/04817* (2022.01)
  *G06F 3/14* (2006.01)

(52) U.S. Cl.
  CPC ........ *G06F 3/04817* (2013.01); *G06F 3/1423* (2013.01); *B60K 2370/119* (2019.05); *B60K 2370/143* (2019.05); *B60K 2370/1529* (2019.05); *B60K 2370/161* (2019.05); *B60K 2370/55* (2019.05); *B60K 2370/73* (2019.05)

(58) Field of Classification Search
  CPC ...... B60K 2370/1529; B60K 2370/161; B60K 2370/143; B60K 2370/73; B60K 2370/119; B60K 2370/55
  See application file for complete search history.

(56) References Cited

OTHER PUBLICATIONS

International Search Report and Written Opinion for International Application No. PCT/EP2020/073004, dated Oct. 27, 2020, 12 pages (French).
English Translation of the Written Opinion for International Application No. PCT/EP2020/073004, dated Oct. 27, 2020, 7 pages.

\* cited by examiner

VEHICLE TOUCH CONTROL SYSTEM AND METHOD

CROSS REFERENCE TO RELATED APPLICATIONS

This application is the U.S. National Phase application of PCT International Application No. PCT/EP2020/073004, filed Aug. 17, 2020, which claims priority to French Patent Application No. 1909458, filed Aug. 28, 2019, the contents of such applications being incorporated by reference herein.

FIELD OF THE INVENTION

The present invention relates generally to a vehicle function control system.

More particularly, the invention relates to a control system that allows the user to control a function by touch without having to take his eyes from the road, thereby improving driving safety.

BACKGROUND OF THE INVENTION

Current vehicles of all types (i.e. electric vehicle (EV), hybrid electric vehicle (HEV), and thermal vehicle) incorporate equipment such as an automotive multimedia system and a navigation system. The automotive multimedia system comprises a human-machine interface (HMI) composed mainly of a screen, generally a touch screen, and an operating system. The screen of the multimedia system is located on the right or left side of the driver's seat of a vehicle.

For each display of information produced on the touch screen of the automotive multimedia system, this touch screen can be considered able to be divided into multiple active areas configured, on the one hand, to display display data such as icons representative of functions offered by said multimedia system (e.g. playing music) and, on the other hand, to allow the user (i.e. the driver of the vehicle) to control/activate a function by pressing an active area corresponding to the function to be controlled. Indeed, these active areas take on the role of mechanical buttons used by earlier multimedia systems. Current systems retain very few, or even no longer have any, mechanical buttons.

FIG. 1 shows an example of a display 22 produced on a screen 31 of an automotive multimedia system 2. According to this example, the screen 31 is a touch screen considered to be divided into multiple active areas 41 to 43 and 45 to 48. These active areas 41 to 43 and 45 to 48 each display display data about a function offered by the automotive multimedia system 2. For example, the active area 45 displays an image that is representative of a music album comprising songs played by the automotive multimedia system 2. The active areas 41 to 43 display a "previous track", "pause" and "next track" music control key, respectively. The active areas 46 to 48 display a "Radio", "USB" ("universal serial (computer) bus") and "BT" ("Bluetooth", a communications standard) function control key, respectively. The remainder of the screen 31 is a background area 44 that can display information but that is not an active area.

The implementation of such active areas allows the user to control a function entirely by touch without searching for the exact locations of mechanical buttons. Activating a control by pressing the screen 31 of the automotive multimedia system 2 nevertheless requires special attention. For example, if the user no longer wants to listen to songs from an album, he inevitably takes his eyes (even if only for a short period lasting a few seconds, for example) from the road because he has to turn his head towards the screen 31 in order to press the active area 42 or 45 precisely to stop the music.

If a function control as above has to be carried out during a driving phase, the user turns his attention away from the road for a short period lasting a few seconds, which may be enough to cause an accident.

There is therefore a need for a solution allowing the user to control a function on a touch screen without having to take his eyes from the road, in order to improve driving safety.

SUMMARY OF THE INVENTION

To achieve this result, an aspect of the present invention relates to a control system installed aboard a vehicle and configured to display active areas of a control touch screen on a remote screen, so as to allow the user to select one of said active areas using a touch gesture on the control touch screen in order to control a function of equipment of the vehicle. Said control system comprises a computation module; a remote screen configured to display display data corresponding to said function in the user's field of vision; and the control touch screen configured to generate instruction data associated with a control area; said control area being defined as a part of the control touch screen on which the user performs the touch gesture on the basis of said display data displayed by the remote screen. Said computation module, coupled to the control touch screen and to the remote screen, is configured to generate said display data when the computation module is activated by a random press performed on the control touch screen; to determine, on the basis of said instruction data received from the control touch screen, the function controlled by the user; to communicate with said equipment of the vehicle so that the equipment activates the function controlled by the user; and to generate guidance data corresponding to said function and displayed in the user's field of vision by the remote screen, so as to indicate a direction in which the user needs to perform the touch gesture on the control touch screen in order to control said function.

An aspect of the invention thus allows the user to control a function by touch without requiring special attention, so as to improve driving safety.

Advantageously, the remote screen comprises a central area and a display area in which said display data are displayed, the guidance data corresponding to said function indicating a direction from the central area to said display area corresponding to said display data.

Preferably, said guidance data corresponding to the function are intended to display an arrow on the remote screen towards said display area corresponding to said display data of said function.

Advantageously, the instruction data relating to the control area comprise coordinates of the control area and the order of the pixels in the control area that are pressed during performance of the touch gesture; the coordinates of the control area being determined on the basis of the coordinates of at least some of the pixels included in the control area.

Advantageously, the remote screen comprises multiple display areas distributed over a circle shape and around the central area.

Preferably, the computation module is configured to compare the received instruction data relating to the control area with one or more sets of predefined data, so as to determine which function is the one that the user has controlled.

Preferably, the display data corresponding to said function comprise an icon that is representative of said function and coordinates of said display area of the remote screen in which the representative icon is displayed.

Advantageously, the remote screen is a head-up display located in the user's field of vision.

An aspect of the present invention also relates to a control method allowing the user to perform a touch gesture on a control touch screen in order to control a function of equipment of a vehicle. Said control method comprises a step of generating display data, performed in order to generate display data corresponding to said function when a random press is performed on the control touch screen; a display step, configured to display said display data corresponding to said function on a remote screen in the user's field of vision; a step of generating instruction data, configured to generate instruction data associated with a control area that is defined as a part of the control touch screen on which the user performs the touch gesture on the basis of said display data displayed by the remote screen; a determining step, configured to determine, on the basis of said instruction data received from the control touch screen, which function is the one controlled by the user; a communication step, performed in order to ask the equipment to activate said function controlled by the user; a step of generating guidance data corresponding to said function, configured to indicate a direction in which the user needs to perform the touch gesture on the control touch screen in order to control said function; and a step of the remote screen displaying said guidance data in the user's field of vision.

According to the control method, the remote screen is separate from the control touch screen and the guidance data corresponding to said function indicate a direction from a central area of the remote screen to a display area corresponding to said function.

BRIEF DESCRIPTION OF THE DRAWINGS

Other features and advantages of aspects pf the invention will become more clearly apparent on reading the description that follows. This description is purely illustrative and must be read with reference to the attached drawings, in which.

It should be noted that the figures outline an aspect of the invention in detail for the purpose of implementation thereof, said figures of course being able, where appropriate, to serve to better define the invention.

DETAILED DESCRIPTION OF THE PREFERRED EMBODIMENTS

Figure 2:
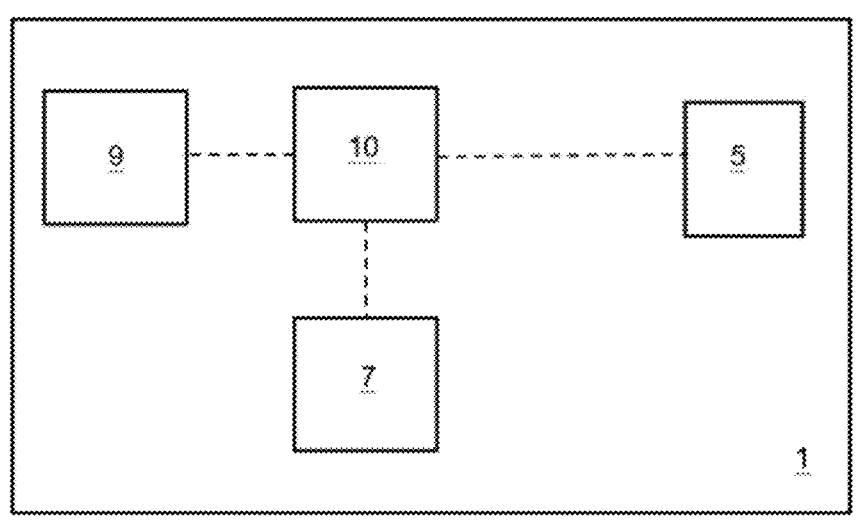
FIG. 2 shows a control system for a vehicle according to one embodiment of the invention.

FIG. 2 shows a control system 1 installed aboard a vehicle, according to one embodiment of the invention. The control system 1, comprising a computation module 10, a control touch screen 5 and a remote screen 9, is coupled to equipment (not shown in the figures) of the vehicle, so as to allow the user to control a function offered by said equipment by looking at at least display data displayed on the remote screen 9 and by performing a touch gesture on the control touch screen 5. Said equipment is for example an automotive multimedia system such as the automotive multimedia system 2 described above. The user is for example the driver of the vehicle.

According to a preferred embodiment, the computation module 10 is produced by an electronic control unit of the vehicle. An aspect of the invention is, however, not limited by the equipment used to produce the computation module 10. For example, alternatively, the computation module 10 can be a control unit of the automotive multimedia system of the vehicle. Advantageously, the control system 1 further comprises a data storage module 7 coupled to the computation module 10 and configured to store at least some of the data generated and/or received by at least one of the following modules: the control touch screen 5 and the computation module 10. The data storage module 7 can be a data storage means existing in the vehicle.

The remote screen 9, coupled to the computation module 10, is located in the user's field of vision. The remote screen 9 is preferably an onboard screen integrated in an instrument panel of the vehicle, and is advantageously produced by existing display equipment of the vehicle. Advantageously, the remote screen 9 is a head-up display (HUD).

The control touch screen 5, coupled to the computation module 10, is preferably a touch screen included in said equipment of the vehicle, such as the screen 31 of the automotive multimedia system 2 above. The control touch screen 5, like the screen 31, is generally installed on the right side of the driver's seat of a vehicle. Advantageously, the control touch screen 5 is a touch screen of resistive or capacitive type. An aspect of the invention is nevertheless independent of the type (resistive or capacitive, for example) of touch screen used to produce the control touch screen 5.

As mentioned previously, the display data are displayed in the user's field of vision by the remote screen 9 instead of by the control touch screen 5. Thus, when the user controls the function offered by said equipment, he can be guided by the display data displayed by the remote screen 9 (e.g. icons representative of functions offered) without taking his eyes from the road. At the same time, the control touch screen 5 then serves as an input means allowing the user to perform the touch gesture to activate the function. In this way, the user no longer has to turn his head towards the control touch screen 5 either during the time in which the display data displayed on the remote screen 9 are read or during the time in which the touch gesture is performed on the control touch screen 5. Driving safety can thus be improved.

Figure 1:
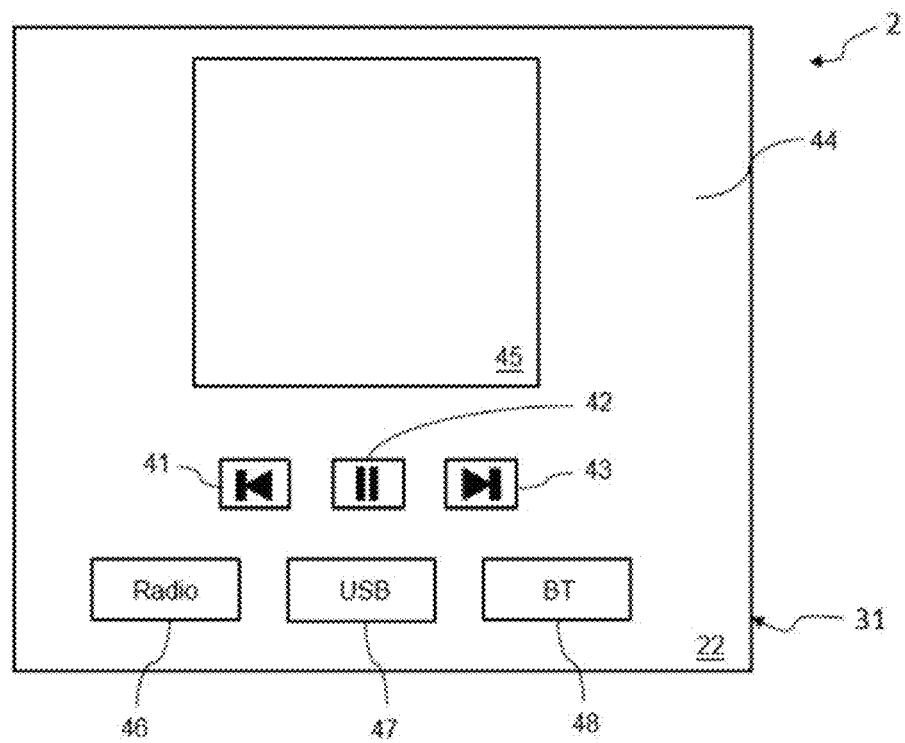
FIG. 1 shows an example of a display produced on a touch screen of a conventional automotive multimedia system for a vehicle.

It is noted that in general the surface area of the remote screen 9 is less than that of the control touch screen 5. For example, as shown in FIG. 1, the display 22 produced on the screen 31 has a display surface area greater than that of the remote screen 9. Another display 52a, as shown in FIG. 3, in particular does not display any secondary information, such as the image representative of a music album that is displayed in the active area 45 shown in FIG. 1.

Figure 3:
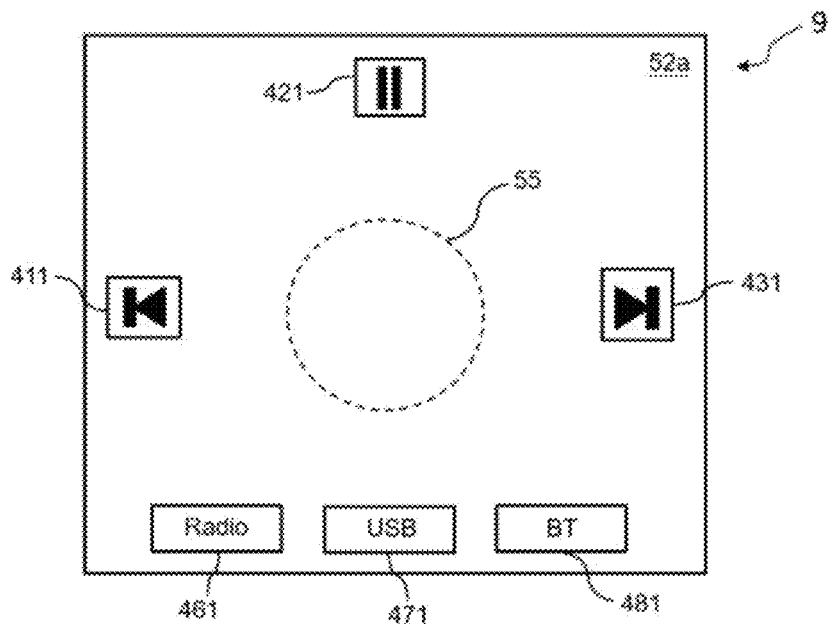
FIG. 3 shows a display produced on a remote screen of the control system according to one embodiment of the invention.
Figure 4:
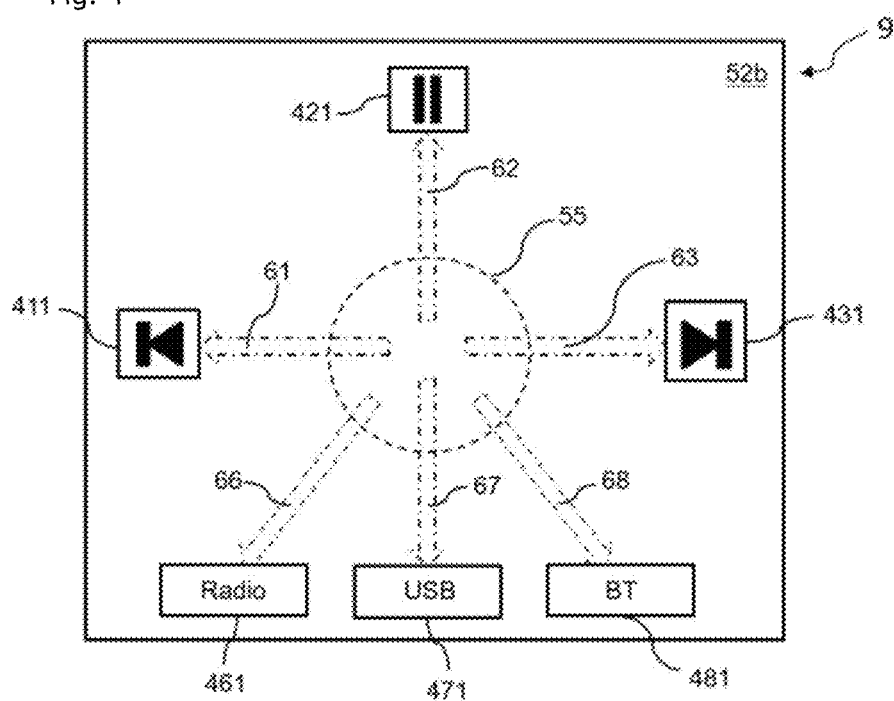
FIG. 4 shows another display comprising guidance data, this display being produced on a remote screen of the control system according to one embodiment of the invention.
Figure 5:
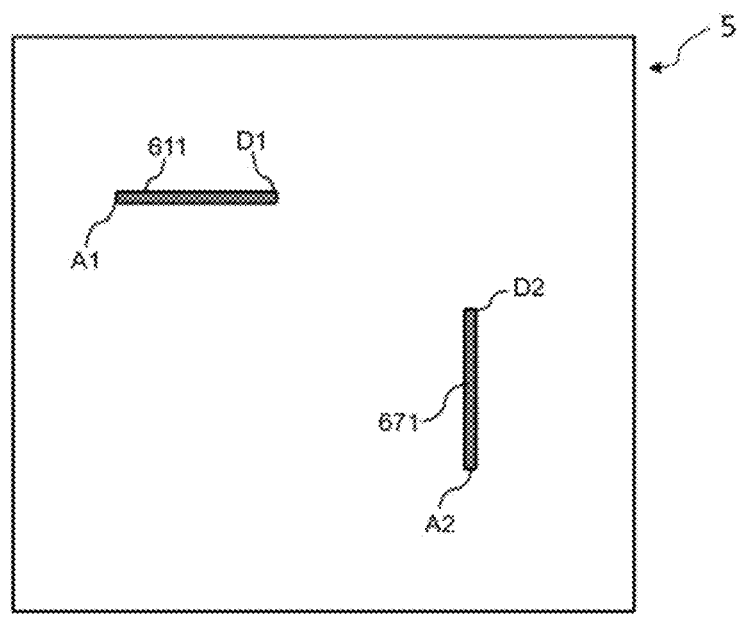
FIG. 5 shows control areas corresponding to touch gestures performed by the user on a control touch screen of the control system, according to one embodiment of the invention.

Before providing a detailed description of the operation of the control touch screen 5 and the examples shown in FIGS. 3 to 5, we will describe the triggering of the generation of display data.

The user triggers the generation of the display data by performing a trigger press at a random point on the control touch screen 5, this meaning that the user is ready to perform a touch gesture from this random point, which is then considered as a starting point for the touch gesture on the control touch screen 5 in order to control the function. In order to trigger said generation of the display data and control the function, an input means performs the trigger press and/or the touch gesture on the control touch screen 5. The input means may be a stylus, or preferably one or more of the user's fingers. It is noted that in order to perform the trigger press and/or the touch gesture on the control touch screen 5 while the vehicle is being driven, it is more practical for the user to use his fingers than a stylus as the input means. In addition, so as not to interfere with other touch controls that are not intended to be processed by the control system 1 and that are produced for example using a single finger of the user, the input means comprises two of the user's fingers. Advantageously, the trigger press lasts for a period of between 1 and 3 seconds in order to inform the computation module 10 that the user is ready to perform a touch gesture to control a function corresponding to said touch gesture.

The computation module 10 is then configured to generate the display data that correspond to a function offered by the equipment and that are intended to be displayed on the remote screen 9. In one embodiment, the display data corresponding to said function comprise an icon that is representative of said function and coordinates (e.g. in two dimensions) of a display area of the remote screen 9 that is used to display the representative icon, as shown in FIG. 3. In addition, as mentioned previously, the generation of the display data is activated preferably by a trigger press performed by the user at a random point on the control touch screen 5; that is to say that in order to trigger the generation of the display data, the user no longer has to press a certain precise point on the control touch screen 5.

The remote screen 9, comprising one or more display areas, is configured to display the display data generated by the computation module 10 for said function in the user's field of vision. The display areas each include a plurality of pixels. The coordinates of the display area are preferably determined on the basis of the coordinates of at least some of the pixels of the display area.

For example, as shown in FIG. 3, the computation module 10 generates display data displayed in each of the display areas 411, 421, 431, 461, 471 and 481. The display area 431 displays an icon that is representative of a "next track" function offered by the automotive multimedia system of the vehicle. The "next track" function, as mentioned above, is optionally also displayed on the control touch screen 5. Similarly, the display areas 411, 421, 461, 471 and 481 each display an icon that is representative of a function offered by the automotive multimedia system. In addition, the display areas 411, 421, 431, 461, 471 and 481 are, advantageously, distributed over a circle shape and around a central area 55 of the remote screen 9.

In one advantageous embodiment, for each function offered by said equipment of the vehicle, the remote screen 9 is configured to display in the user's field of vision not only his display data but also guidance data generated by the computation module 10, as shown in an example described by FIG. 4. FIG. 4 shows a display 52*b* comprising both the display data from the display 52*a* and guidance data corresponding to said display data from the display 52*a*. The display 52*b* is displayed on the remote screen 9.

The guidance data corresponding to said function indicate a direction from the central area 55 to the display area corresponding to said function. Preferably, in order to indicate the direction from the central area 55 to the display area corresponding to the function, the guidance data corresponding to the function are intended to display an arrow towards an icon that is representative of said function. For example, an arrow 61, displayed in its display area, indicates a leftward direction from the central area 55 to the icon that is representative of a "previous track" function displayed in the display area 411. Similarly, the arrows 62, 63, 66, 67 and 68 of the display 52*b* in FIG. 4 indicate a direction from the central area 55 to a representative icon displayed in one of the display areas 421, 431, 461, 471 and 481, respectively. These guidance data preferably further comprise coordinates (e.g. in two dimensions) of a display area of the remote screen 9 that is used to display said arrow. The display areas each include a plurality of pixels. The coordinates of the display area are preferably determined on the basis of the coordinates of at least some of the pixels of the display area.

While looking at the display data, and preferably with the guidance data all displayed on the remote screen 9, the user performs the touch gesture on the control touch screen 5 to control the function without having to turn his head to look at the control touch screen 5. Preferably, the user slides the input means (e.g. a finger of the user) from said starting point to a stopping point on the control touch screen 5, in a direction corresponding to the direction that corresponds to the function to be controlled and is indicated by the remote screen 9. A path of the input means between the starting point and the stopping point, and the direction followed, then define a control area corresponding to said function to be controlled.

FIG. 5 shows control areas corresponding to touch gestures performed by the user on the control touch screen 5 while looking at the display 52*b* of FIG. 4. For example, in order to control the "previous track" function, the user performs a touch gesture by sliding the input means from a starting point D1 to a stopping point A1, in the leftward direction corresponding to the direction indicated by the arrow 61 of the display 52*b* displayed on the remote screen 9. This path of the input means between the starting point D1 and the stopping point A1, and the direction followed corresponding to the direction indicated by the arrow 61, then define a control area 611 corresponding to the "previous track" function. Similarly, in order to control the "USB" function, the user performs a touch gesture by sliding the input means from a starting point D2 to a stopping point A2, in a downward direction corresponding to the direction indicated by the arrow 67 of the display 52*b* displayed on the remote screen 9. This path of the input means between the starting point D2 and the stopping point A2, and the direction followed corresponding to the direction indicated by the arrow 67, then define a control area 671 corresponding to the "USB" function.

The control area includes a plurality of pixels. The coordinates of the control area are preferably determined on the basis of the coordinates of at least some of the pixels of the control area. In addition, the control area is preferably linear in shape, like the control areas 611 and 671 shown in FIG. 5. In a preferred embodiment, if the distance in pixels between the starting point and the stopping point of the control area is greater than or equal to a predefined threshold, the control area is considered formed.

The control touch screen 5 is then configured to generate instruction data relating to the control area in which the touch gesture is performed by the user to control the function displayed on the remote screen 9. In one embodiment, the instruction data relating to the control area comprise coordinates (e.g. in two dimensions) of the control area and the order of the pixels in the control area 611 that are pressed during performance of the touch gesture.

Next, the computation module 10 is configured to determine, on the basis of said instruction data relating to the control area that are received from the control touch screen 5, which function is the one that the user has controlled using the control touch screen 5.

Preferably, the computation module 10 is intended to compare the received instruction data (e.g. the received instruction data relating to the control area 611) with one or more sets of predefined data each corresponding to one of the functions offered by the equipment. If the instruction data are similar to one of the sets of predefined data, the function corresponding to said set of predefined data is considered to be the function controlled (e.g. the "previous track" function) by the user.

The computation module 10 is then configured to communicate with said equipment of the vehicle so that the equipment activates the function controlled by the user. In other words, the computation module 10 transmits an instruction to said equipment in order to ask it to activate said function controlled by the user.

Optionally, the control touch screen 5 can display said display data and/or said guidance data that are intended to be displayed on the remote screen 9. Advantageously, the control touch screen 5 can display a context (e.g. a radio context or a multimedia context) corresponding to the function controlled by the user. Depending on the different context displayed by the control touch screen 5, the functions displayed on the remote screen 9 could be different.

In one embodiment, it is possible to control a function that is not displayed on the control touch screen 5, for example air conditioning functions offered by a typical air conditioning system of the vehicle. The typical air conditioning system comprises activation elements (e.g. mechanical buttons) each corresponding to an air conditioning function. By using the control system 1, the remote screen 9 is intended to display air conditioning functions that are not displayed on the control touch screen 5 in the user's field of vision. The user therefore no longer has to press the mechanical button precisely to activate the air conditioning function.

Display data and/or guidance data generated by the computation module 10 and displayed on the remote screen 9 for the air conditioning function, and data generated during control of this air conditioning function that is produced by a touch gesture performed by the user on the control touch screen 5, are similar to those described above for the functions offered by the automotive multimedia system of the vehicle.

An aspect of the invention thus allows the user to control a vehicle function by touch without having to take his eyes from the road. The user's period of inattentiveness is therefore reduced. Driving safety is thus improved.

The invention is not limited to the embodiments described above but encompasses any embodiment conforming to the spirit of the invention.

The invention claimed is:

1. A control system installed aboard a vehicle and configured to allow a user to control a function of equipment of the vehicle by performing a touch gesture, the control system comprising:

a remote screen configured to display display data corresponding to said function in a field of vision of the user, wherein the remote screen comprises a central area and a display area in which said display data are displayed;

a control touch screen separate from the remote screen, the control touch screen configured to generate instruction data associated with a control area, said control area being defined as a part of the control touch screen on which the user performs the touch gesture on the basis of said display data displayed by the remote screen; and a computation module, coupled to the control touch screen and to the remote screen, configured to:
generate said display data when the computation module is activated by a random press performed on the control touch screen;
determine, on the basis of said instruction data received from the control touch screen, the function controlled by the user;
communicate with said equipment of the vehicle so that the equipment activates the function controlled by the user; and
generate guidance data corresponding to said function that are displayed in the user's field of vision by the remote screen, the guidance data including a plurality of arrows, each arrow indicating a direction of a slide gesture performed starting from the central area to said display area on the control touch screen in order to control said function.

2. The control system as claimed in claim 1, wherein said guidance data corresponding to the function display the arrow on the remote screen towards said display area corresponding to said display data of said function.

3. The control system as claimed in claim 1, wherein the instruction data relating to the control area comprise coordinates of the control area and the order of the pixels in the control area that are pressed during performance of the touch gesture; the coordinates of the control area being determined on the basis of the coordinates of at least some of the pixels included in the control area.

4. The control system as claimed in claim 1, wherein the remote screen comprises a central area and at least one display area in which said display data are displayed, the guidance data corresponding to said function indicating a direction from the central area to said display area corresponding to said display data, and
wherein the remote screen comprises multiple display areas distributed over a circle shape and around the central area.

5. The control system as claimed in claim 1, wherein the computation module is configured to compare the received instruction data relating to the control area with one or more sets of predefined data, so as to determine which function is the one the user has controlled.

6. The control system as claimed in claim 1, wherein the display data corresponding to said function comprise an icon that is representative of said function and of the coordinates of said display area of the remote screen in which the representative icon is displayed.

7. The control system as claimed in claim 1, wherein the remote screen is a head-up display located in the user's field of vision.

8. The control system as claimed in claim 1, wherein the slide gesture performed on the control touch screen corresponds to the direction indicated by a corresponding arrow of the plurality of arrows.

9. A control method allowing the user to perform a touch gesture in order to control a function of equipment of a vehicle, the control method comprising:
generating display data, performed in order to generate display data corresponding to said function when a random press is performed on a control touch screen;

a display step, configured to display said display data corresponding to said function on a remote screen in a field of vision of the user, wherein the remote screen comprises a central area and a display area in which said display data are displayed;
generating instruction data, configured to generate instruction data associated with a control area defined as a part of the control touch screen on which the user performs the touch gesture on the basis of said display data displayed on the remote screen, the remote screen being separate from the control touch screen;
a determining step, configured to determine, on the basis of said instruction data received from the control touch screen, which function is the one controlled by the user; and
a communication step, performed in order to ask the equipment to activate said function controlled by the user;
generating guidance data corresponding to said function, the guidance data including a plurality of arrows, each arrow indicating a direction of a slide gesture performed starting from the central area to said display area on the control touch screen in order to control said function, and
a step of the remote screen displaying said guidance data in the user's field of vision.

* * * * *